US008453143B2

(12) United States Patent
Mahalingam et al.

(10) Patent No.: US 8,453,143 B2
(45) Date of Patent: May 28, 2013

(54) REDUCING THE LATENCY OF VIRTUAL INTERRUPT DELIVERY IN VIRTUAL MACHINES

(75) Inventors: Mallik Mahalingam, Sunnyvale, CA (US); Boris Weissman, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 1503 days.

(21) Appl. No.: 11/857,964

(22) Filed: Sep. 19, 2007

(65) Prior Publication Data

US 2010/0223611 A1    Sep. 2, 2010

(51) Int. Cl.
*G06F 9/455* (2006.01)
*G06F 13/24* (2006.01)

(52) U.S. Cl.
USPC ................................. 718/1; 710/266; 710/268

(58) Field of Classification Search
USPC ................................. 710/260–269; 718/1–105
See application file for complete search history.

(56) References Cited

U.S. PATENT DOCUMENTS

| | | | | |
|---|---|---|---|---|
| 5,560,019 | A * | 9/1996 | Narad | 710/260 |
| 6,075,938 | A * | 6/2000 | Bugnion et al. | 703/27 |
| 6,496,847 | B1 | 12/2002 | Bugnion et al. | |
| 7,000,051 | B2 * | 2/2006 | Armstrong et al. | 710/267 |
| 7,130,949 | B2 * | 10/2006 | Belmar et al. | 710/260 |
| 7,149,843 | B1 | 12/2006 | Agesen et al. | |
| 7,209,994 | B1 * | 4/2007 | Klaiber et al. | 710/264 |
| 7,222,203 | B2 * | 5/2007 | Madukkarumukumana et al. | 710/260 |
| 7,237,051 | B2 | 6/2007 | Bennett et al. | |
| 7,281,075 | B2 * | 10/2007 | Armstrong et al. | 710/267 |
| 7,707,341 | B1 * | 4/2010 | Klaiber et al. | 710/244 |
| 2004/0117532 | A1 * | 6/2004 | Bennett et al. | 710/260 |
| 2005/0076155 | A1 | 4/2005 | Lowell | |
| 2005/0076186 | A1 | 4/2005 | Traut | |
| 2005/0125580 | A1 | 6/2005 | Madukkarumukumana et al. | |
| 2005/0132365 | A1 | 6/2005 | Madukkarumukumana et al. | |
| 2006/0026563 | A1 | 2/2006 | Cabillic | |
| 2007/0157197 | A1 * | 7/2007 | Neiger et al. | 718/1 |

OTHER PUBLICATIONS

Notification of Transmittal of the International Search Report and the Written Opinion of the International Searching Authority, or the Declaration, Dec. 1, 2008, Patent Cooperation Treaty "PCT", Alexandria, Virginia.
Supplementary European Search Report and Annex to the European Search Report dated Dec. 20, 2010.

* cited by examiner

*Primary Examiner* — Abdullah Al Kawsar

(57) ABSTRACT

The latency of virtual interrupt delivery in virtual machines is reduced by normalizing and exposing the virtual interrupt routing information of each VM to a privileged domain such as the VMkernel in an organized manner to enable virtual interrupt delivery that minimizes the number of VCPU hops. A computer implemented method of processing the virtual I/O request comprises receiving the virtual I/O request, responsive to completing a physical I/O corresponding to the virtual I/O request, referring to a virtual CPU set including information on a destination virtual CPU designated by the guest operating system for handling a virtual interrupt corresponding to the virtual I/O request, and generating the virtual interrupt corresponding to the virtual I/O request to the destination virtual CPU determined by referring to the virtual CPU set.

20 Claims, 6 Drawing Sheets

REDUCING THE LATENCY OF VIRTUAL INTERRUPT DELIVERY IN VIRTUAL MACHINES

BACKGROUND OF THE INVENTION

1. Field of the Invention

This invention relates generally to a virtualized computer system and, in particular, to a method and system for reducing the latency of virtual interrupt delivery in virtual machines of a virtualized computer system.

2. Description of the Related Art

The advantages of virtual machine technology have become widely recognized. Among these advantages is the ability to run multiple virtual machines on a single host platform. This makes better use of the capacity of the hardware, while still ensuring that each user enjoys the features of a "complete" computer. Depending on how it is implemented, virtualization can also provide greater security, since the virtualization can isolate potentially unstable or unsafe software so that it cannot adversely affect the hardware state or system files required for running the physical (as opposed to virtual) hardware.

As is well known in the field of computer science, a virtual machine (VM) is an abstraction—a "virtualization"—of an actual physical computer system. FIG. 1 shows one possible arrangement of a computer system 700 that implements virtualization. A virtual machine (VM) or "guest" 200 is installed on a "host platform," or simply "host," which will include system hardware, that is, a hardware platform 101, and one or more layers or co-resident components comprising system-level software, such as an operating system or similar kernel, or a virtual machine monitor or hypervisor (see below), or some combination of these. The system hardware 101 typically includes one or more processors 110, memory 130, and physical hardware devices 100 including some form of mass storage 140 and various other devices 170.

Each VM 200 will typically have both virtual system hardware 201 and guest system software 202. The virtual system hardware 201 typically includes at least one virtual CPU, virtual memory 230, at least one virtual disk 240, and one or more virtual devices 270. Note that a disk—virtual or physical—is also a "device," but is usually considered separately because of the important role of the disk. All of the virtual hardware components of the VM may be implemented in software using known techniques to emulate the corresponding physical components. The guest system software includes a guest operating system (OS) 220 and drivers 224 as needed for the various virtual devices 270. Although FIG. 1 illustrates that the virtual system hardware 201 is included in the VMs 200, the virtual system hardware 201 may reside in a gray area between the VMs 200 and the VMMs 300 or in the VMMs 300 themselves, as illustrated in FIG. 2.

Referring back to FIG. 1, note that a single VM may be configured with more than one virtualized processor. To permit computer systems to scale to larger numbers of concurrent threads, systems with multiple CPUs have been developed. These symmetric multi-processor (SMP) systems are available as extensions of the PC platform and from other vendors. Essentially, an SMP system is a hardware platform that connects multiple processors to a shared main memory and shared I/O devices. Virtual machines may also be configured as SMP VMs. FIG. 1, for example, illustrates multiple virtual processors 210-0, 210-1, . . . , 210-$m$ (VCPU0, VCPU1, . . . , VCPUm) within the VM 200.

Yet another configuration is found in a so-called "multi-core" architecture, in which more than one physical CPU is fabricated on a single chip, with its own set of functional units (such as a floating-point unit and an arithmetic/logic unit ALU), and can execute threads independently; multi-core processors typically share only very limited resources, such as some cache. Still another technique that provides for simultaneous execution of multiple threads is referred to as "simultaneous multi-threading," in which more than one logical CPU (hardware thread) operates simultaneously on a single chip, but in which the logical CPUs flexibly share some resource such as caches, buffers, functional units, etc. This invention may be used regardless of the type—physical and/or logical—or number of processors included in a VM.

If the VM 200 is properly designed, applications 260 running on the VM will function as they would if run on a "real" computer, even though the applications are running at least partially indirectly, that is via the guest OS 220 and virtual processor(s). Executable files will be accessed by the guest OS from the virtual disk 240 or virtual memory 230, which will be portions of the actual physical disk 140 or memory 130 allocated to that VM. Once an application is installed within the VM, the guest OS retrieves files from the virtual disk just as if the files had been pre-stored as the result of a conventional installation of the application. The design and operation of virtual machines are well known in the field of computer science.

Some interface is generally required between the guest software within a VM and the various hardware components and devices in the underlying hardware platform. This interface—which may be referred to generally as "virtualization software"—may include one or more software components and/or layers, possibly including one or more of the software components known in the field of virtual machine technology as "virtual machine monitors" (VMMs), "hypervisors," or virtualization "kernels." Because virtualization terminology has evolved over time and has not yet become fully standardized, these terms do not always provide clear distinctions between the software layers and components to which they refer. For example, "hypervisor" is often used to describe both a VMM and a kernel together, either as separate but cooperating components or with one or more VMMs incorporated wholly or partially into the kernel itself, however, "hypervisor" is sometimes used instead to mean some variant of a VMM alone, which interfaces with some other software layer(s) or component(s) to support the virtualization. Moreover, in some systems, some virtualization code is included in at least one "superior" VM to facilitate the operations of other VMs. Furthermore, specific software support for VMs may be included in the host OS itself. Unless otherwise indicated, the invention described below may be used in virtualized computer systems having any type or configuration of virtualization software.

Moreover, FIG. 1 shows virtual machine monitors that appear as separate entities from other components of the virtualization software. Furthermore, some software components used to implement one illustrated embodiment of the invention are shown and described as being within a "virtualization layer" located logically between all virtual machines and the underlying hardware platform and/or system-level host software. This virtualization layer can be considered part of the overall virtualization software, although it would be possible to implement at least part of this layer in specialized hardware. The illustrated embodiments are given only for the sake of simplicity and clarity and by way of illustration—as mentioned above, the distinctions are not always so clear-cut. Again, unless otherwise indicated or apparent from the description, it is to be assumed that the invention can be implemented anywhere within the overall structure of the virtualization software, and even in systems that provide specific hardware support for virtualization.

The various virtualized hardware components in the VM, such as the virtual CPU(s) 210-0, 210-1, . . . , 210-*m*, the virtual memory 230, the virtual disk 240, and the virtual device(s) 270, are shown as being part of the VM 200 for the sake of conceptual simplicity. In actuality, these "components" are usually implemented as software emulations 330 included in the VMM. One advantage of such an arrangement is that the VMM may (but need not) be set up to expose "generic" devices, which facilitate VM migration and hardware platform-independence.

Different systems may implement virtualization to different degrees—"virtualization" generally relates to a spectrum of definitions rather than to a bright line, and often reflects a design choice with respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS could be an off-the-shelf, commercially available OS with no components included specifically to support use in a virtualized environment.

In contrast, another concept, which has yet to achieve a universally accepted definition, is that of "para-virtualization." As the name implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software.

For some, para-virtualization implies that the guest OS (in particular, its kernel) is specifically designed to support such an interface. According to this view, having, for example, an off-the-shelf version of Microsoft Windows XP™ as the guest OS would not be consistent with the notion of para-virtualization. Others define para-virtualization more broadly to include any guest OS with any code that is specifically intended to provide information directly to any other component of the virtualization software. According to this view, loading a module such as a driver designed to communicate with other virtualization components renders the system para-virtualized, even if the guest OS as such is an off-the-shelf, commercially available OS not specifically designed to support a virtualized computer system. Unless otherwise indicated or apparent, this invention is not restricted to use in systems with any particular "degree" of virtualization and is not to be limited to any particular notion of full or partial ("para-") virtualization.

In addition to the sometimes fuzzy distinction between full and partial (para-) virtualization, two arrangements of intermediate system-level software layer(s) are in general use—a "hosted" configuration and a non-hosted configuration (which is shown in FIG. 1). In a hosted virtualized computer system, an existing, general-purpose operating system forms a "host" OS that is used to perform certain input/output (I/O) operations, alongside and sometimes at the request of the VMM. The Workstation product of VMware, Inc., of Palo Alto, Calif., is an example of a hosted, virtualized computer system, which is also explained in U.S. Pat. No. 6,496,847 (Bugnion, et al., "System and Method for Virtualizing Computer Systems," 17 Dec. 2002).

As illustrated in FIG. 1, in many cases, it may be beneficial to deploy VMMs on top of a software layer—a kernel 600—constructed specifically to provide efficient support for the VMs. This configuration is frequently referred to as being "non-hosted." Compared with a system in which VMMs run directly on the hardware platform, use of a kernel offers greater modularity and facilitates provision of services (for example, resource management) that extend across multiple virtual machines. Compared with a hosted deployment, a kernel may offer greater performance because it can be co-developed with the VMM and be optimized for the characteristics of a workload consisting primarily of VMs/VMMs. The kernel 600 also handles any other applications running on it that can be separately scheduled, as well as a console operating system that, in some architectures, is used to boot the system and facilitate certain user interactions with the virtualization software.

Note that the kernel 600 (also referred to herein as the "VMkernel") is not the same as the kernel that will be within the guest OS 220—as is well known, every operating system has its own kernel. Note also that the kernel 600 is part of the "host" platform of the VM/VMM as defined above even though the configuration shown in FIG. 1 is commonly termed "non-hosted;" moreover, the kernel may be both part of the host and part of the virtualization software or "hypervisor." The difference in terminology is one of perspective and definitions that are still evolving in the art of virtualization.

The kernel 600 is responsible for initiating physical input/output (I/O) on behalf of the VMs 200 and communicating the I/O completion events back to the VMs 200. In fully virtualized systems, I/O completion events often take the form of a virtual interrupt delivered to one of the virtual processors (VCPUs) of the requesting VM. The VMM is typically charged with virtualization of the virtual processors and the virtual interrupt system that guides virtual interrupt delivery. In an SMP virtual machine, the guest OS 220 may program the virtual interrupt system for interrupt delivery to an arbitrary subset of VCPUs. In x86 domains, this information is generally distributed among different pieces of virtual interrupt hardware such as IO APIC (Advanced Programmable Interrupt Controller), local APIC (Advanced Programmable Interrupt Controller), the MSI (Message Signaled Interrupt) state in device PCI (Peripheral Component Interconnect) configuration space, and the like.

FIG. 2 illustrates how I/O is completed in a virtualized computer system. When the guest O/S 220 requests a virtual I/O on a virtual system hardware 201, the virtualization software (the VMM 300 and the VMkernel 600) generates a physical I/O that corresponds to the virtual I/O request to the actual hardware device 100 backing up the virtual system hardware 201. Once the physical I/O is completed, the hardware device 100 generates a physical (hardware) interrupt to inform the virtualization software of the completion of the physical I/O. In response, the VMM 300 (more specifically, the interrupt system 280 including the virtual interrupt controller 282 and the VMM interrupt router 284) generates a virtual interrupt to the guest O/S 220 to inform the guest O/S 220 of completion of the I/O.

The virtual interrupt state is dynamic and might be changed by the guest OS 220 after a physical I/O is requested but before it has been completed. Because of the complexity of virtual interrupt systems, the kernel 600 typically does not have information on the details of the guest interrupt system programming. This may cause latency in the delivery of virtual interrupts, as is explained with reference to FIG. 3.

FIG. 3 is an interaction diagram illustrating how I/O is requested and completed in a conventional virtualized computer system. Referring to FIG. 3 together with FIG. 2, the guest O/S 220 issues a virtual I/O 302 request to a virtual device 201. The virtual device 201 makes a VMKernel call 304 to the VMkernel 600, and the VMkernel 600 issues a command corresponding to the VMKernel call 304 to the VMkernel driver 288. The VMkernel driver 288 (FIG. 2) provides an interface between the VMkernel 600 and the physical hardware device 100 that corresponds to the virtual device 201. Thus, based on the command 306 corresponding to the VMkernel call 304, the VMkernel driver 288 makes a hardware specific I/O request 308 that is specific to the hardware device 100 to which the I/O request is destined.

Thereafter, typically some time will pass (as indicated by the double dotted lines), until the I/O is actually completed 310 by the hardware device 100. The hardware device 100 makes a hardware interrupt 312 to the VMkernel driver 288 and to the VMkernel 600 to notify the VMkernel 600 that the hardware I/O is complete. The VMkernel driver 288 inspects (314, 316) the device state to determine the specifics of the I/O operation. The VMkernel driver 288 makes the I/O data available 318 to the VMkernel 600.

The privileged domain (the VMkernel 600) is typically charged with communicating I/O completions to virtual processors of VMs. However, in conventional virtualized computer systems, the VMkernel 600 does not have access to all necessary information about the details of the virtual interrupt system configuration of each VM to optimally select a set of destination VCPUs for each I/O completion event. Since the VMkernel 600 does not know the correct destination VCPU 210 responsible for the I/O and virtual interrupt at this time, the VMkernel 600 typically just selects one of the VCPUs of the VM 200 in order to notify it of the I/O completion. In response, the VMkernel 600 posts an asynchronous action 321 to some VCPU 210 (virtual system hardware 201) to generate the virtual interrupt to the selected VCPU 210. In response, the virtual device 201 asserts an IRQ (Interrupt Request Line) 322 to obtain the (interrupt vector, VCPU) pair for the virtual interrupt to notify the guest O/S 220 of the completion of the I/O. The term "(interrupt vector, VCPU) pair" refers to the set of data that includes a pair of the interrupt vector and the VCPU.

If the preliminary target VCPU is already running on a different CPU (physical CPU), VMkernel 600 dispatches an inter-processor interrupt (IPI) to the target VCPU to ensure that a virtual interrupt 328 is dispatched in a timely manner with the (interrupt vector, VCPU) pair. On the other hand, if the preliminary target VCPU isn't currently scheduled, a scheduler intervention might be necessary to ensure that the target VCPU receives an I/O completion event. In this regard, the initial target VCPU consults the virtual interrupt system 280 to determine the final destination VCPU, and an action is dispatched from the initial preliminary target VCPU to the final destination VCPU. If the final destination VCPU is not running, the VMM interrupt system 280 sends a reschedule request 324 to the VMkernel 600 to reschedule that VCPU so that it can process an action. As a result, the VMkernel 600 reschedules 326 that final destination VCPU. The guest-designated final destination VCPU is often different from the initial VCPU target selected by the VMkernel 600 without consulting the virtual interrupt system 280. If so, the VMM interrupt system 280 redispatches a virtual interrupt 328 to the final destination VCPU set. The last step might involve IPIs and scheduler invocations similar to those of the original dispatch. In some elaborate cases of Logical Delivery Mode, the target might be not a single VCPU, but an arbitrary subset of VCPUs.

Because the VMkernel 600 attempts to invoke the virtual interrupt without knowing which specific VCPU can receive the virtual interrupt of the completion of the I/O, the step 324 of rescheduling the request and the step 326 of rescheduling the VCPU may be necessary if the guest designated target VCPU is different from the original VCPU target selected by the VMkernel 600. These additional steps 324, 326 increase the latency of virtual interrupt deliveries in virtual machines, which degrade performance of the virtualized computer system.

Therefore, there is a need for a technique for reducing the latency of virtual interrupt deliveries in virtual machines.

SUMMARY OF THE INVENTION

Embodiments of the present invention include a method and system for reducing the latency of virtual interrupt delivery in virtual machines, by normalizing and exposing the virtual interrupt routing information of each VM to a privileged domain such as the VMkernel in an organized manner to enable virtual interrupt delivery that minimizes the number of VCPU hops. More specifically, a computer implemented method of processing the virtual I/O request according to one embodiment of the invention comprises receiving the virtual I/O request; responsive to completing a physical I/O corresponding to the virtual I/O request, referring to a virtual CPU set data structure including information identifying a destination virtual CPU designated by the guest operating system to be responsible for handling a virtual interrupt corresponding to the virtual I/O request; and generating the virtual interrupt corresponding to the virtual I/O request to the destination virtual CPU determined by referring to the virtual CPU set.

The virtual CPU set data structure is updated to reflect changes in the destination virtual CPU designated by the guest operating system to be responsible for handling the virtual interrupts. Such change in the destination virtual CPU can be determined by intercepting guest OS instructions that modify certain states in an interrupt controller that deal with an interrupt state. The virtual CPU set data structure is made accessible to both the virtual machine monitor and the privileged domain (kernel) of the virtualized computer system.

Because the VMkernel is aware of the correct destination VCPU designated by the guest O/S for handling the virtual interrupt, the VMkernel can generate actions to generate the virtual interrupt notifying the guest O/S of completion of the virtual I/O request for delivery to the "correct" VCPU designated by the guest O/S. There is no need for the VMM interrupt system to reschedule any posted action to any different VCPU. Thus, the latency in delivering the virtual interrupt to the guest OS is significantly reduced.

The present invention as described herein may be used to advantage in both a hosted and a non-hosted virtualized computer system, regardless of the degree of virtualization, in which the virtual machine(s) have any number of physical and/or logical virtualized processors. The present invention may also be implemented directly in a computer's primary operating system (OS), both where the OS is designed to support virtual machines and where it is not. Moreover, the invention may even be implemented wholly or partially in hardware, for example in processor architectures intended to provide hardware support for virtual machines. The present invention may be implemented as a computer program product including computer instructions configured to perform the methods of the present invention. The computer program can be stored on a computer readable storage medium to run on one or more processors of the virtualized computer system.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

DETAILED DESCRIPTION OF EMBODIMENTS

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 4:
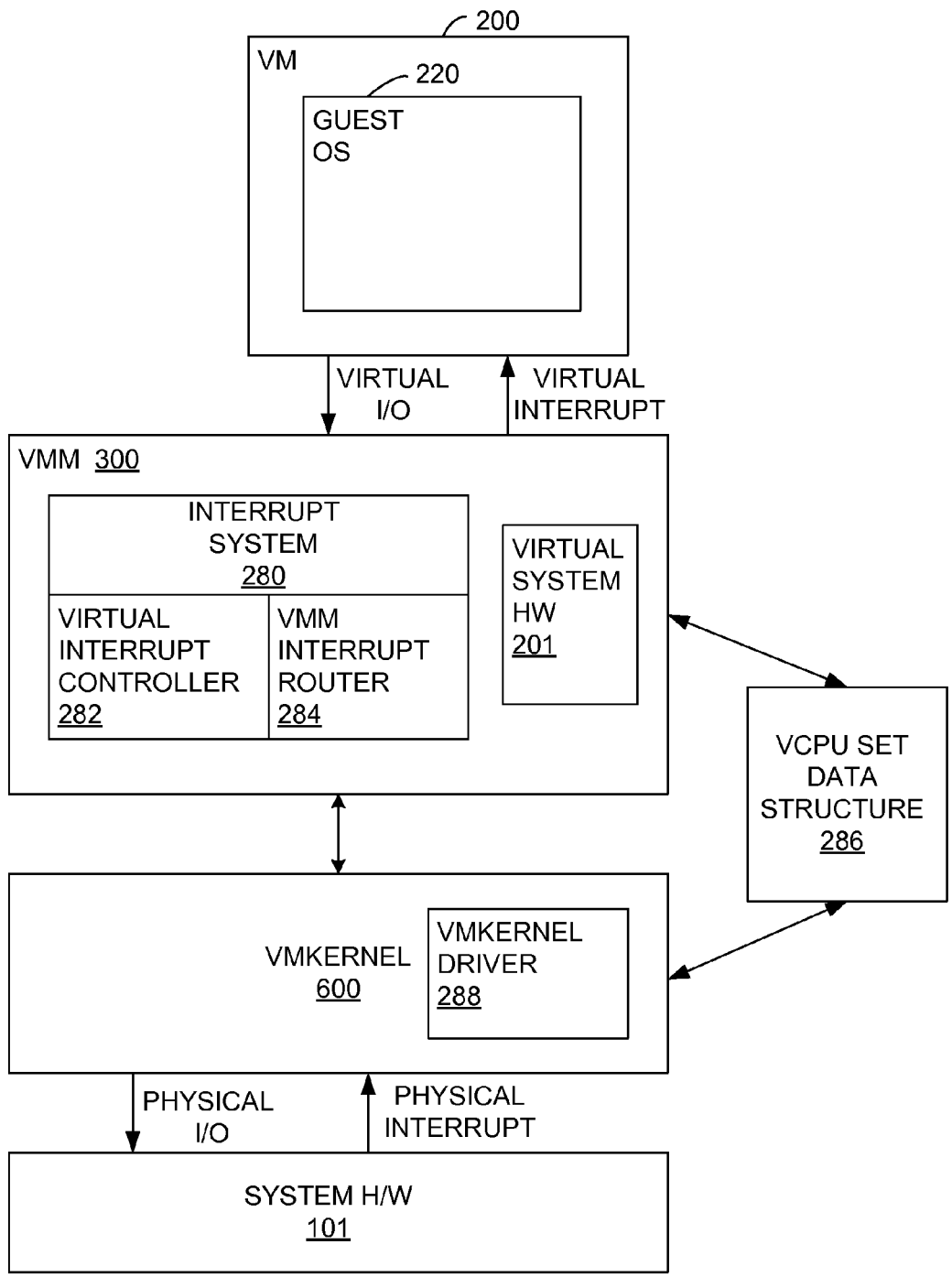
FIG. 4 illustrates how I/Os is completed in a virtualized computer system, according to one embodiment of the present invention.

FIG. 4 illustrates how I/O is completed in a virtualized computer system, according to one embodiment of the present invention. I/O in the virtualized computer system according to the embodiment operates differently from I/O in conventional virtualized computer systems in that virtual interrupt routing information is normalized and exposed to the VMkernel 600 (as well as the VMM 300). This is to enable the VMkernel 600 to post virtual interrupt carrying actions "intelligently" to the guest OS-designated VCPU targets, reducing the physical IPI rate and the number of switches and improving the latency of virtual interrupt delivery.

More specifically, when the guest O/S 220 requests a virtual I/O on a virtual system hardware 201, the virtualization software (the VMM 300 and the VMkernel 600) generates a physical I/O that corresponds to the virtual I/O request to the actual hardware device 100 backing up the virtual system hardware 201. Once the physical I/O is completed, the hardware device 100 generates a physical (hardware) interrupt to inform the virtualization software of completion of the physical I/O.

When the VMkernel 600 posts an action to the virtual CPU to generate a virtual interrupt, it posts the action with the correct target VCPU designated by the guest OS 220 to handle virtual interrupt, by consulting the VCPU set data structure 286 that contains such information. Designation of the target VCPU by the guest OS 220 may be indirect and "soft" in the sense that the guest OS 220 does not designate the target VCPU for each interrupt at the interrupt delivery time but that the guest OS 220 programs the interrupt system 280 much earlier, for example, during boot. In some cases, the designation of the target VCPU may be more explicit than in other cases. For example, the guest OS 220 can specify that interrupts from certain devices must be bound to a particular VPCU or set of VCPUs. The term "VCPU set" herein refers to a designation of one or more of the VCPUs in a virtual machine. In other cases, the guest OS 220 may leave the VCPU selection to the interrupt hardware with some qualifications such as always delivering an interrupt to the lowest priority VCPU. In one embodiment, the VCPU set data structure 286 includes an array of VCPU sets indexed by the interrupt vector number to designate the current destination VCPU set designated by the guest OS 220 for each interrupt vector. This VCPU set data structure 286 is shared between the VMM 300 and the VMkernel 600 and hides the complexity of the guest interrupt system (different modes of PIC, IOAPIC, APIC, MSI, etc., which are described in more detail below). In another embodiment (not shown herein), the VMM 300 can simply notify the VMkernel 600 on each interrupt routing change without actually keeping a physically shared data structure. Because the VMkernel 600 is aware of the correct destination VCPU designated by the guest OS 220 for handling the virtual interrupt, there is no need for the VMM interrupt system 280 to reschedule the posted action to a different VCPU and thus the latency in delivering the virtual interrupt to the guest OS 220 is significantly reduced. Thus, the VMM 300 (more specifically, the VMM interrupt system 280 including the virtual interrupt controller 282 and the VMM interrupt router 284) generates a virtual interrupt to the guest O/S 220 to inform the guest O/S 220 of completion of the I/O to the "correct" VCPU.

Figure 5:
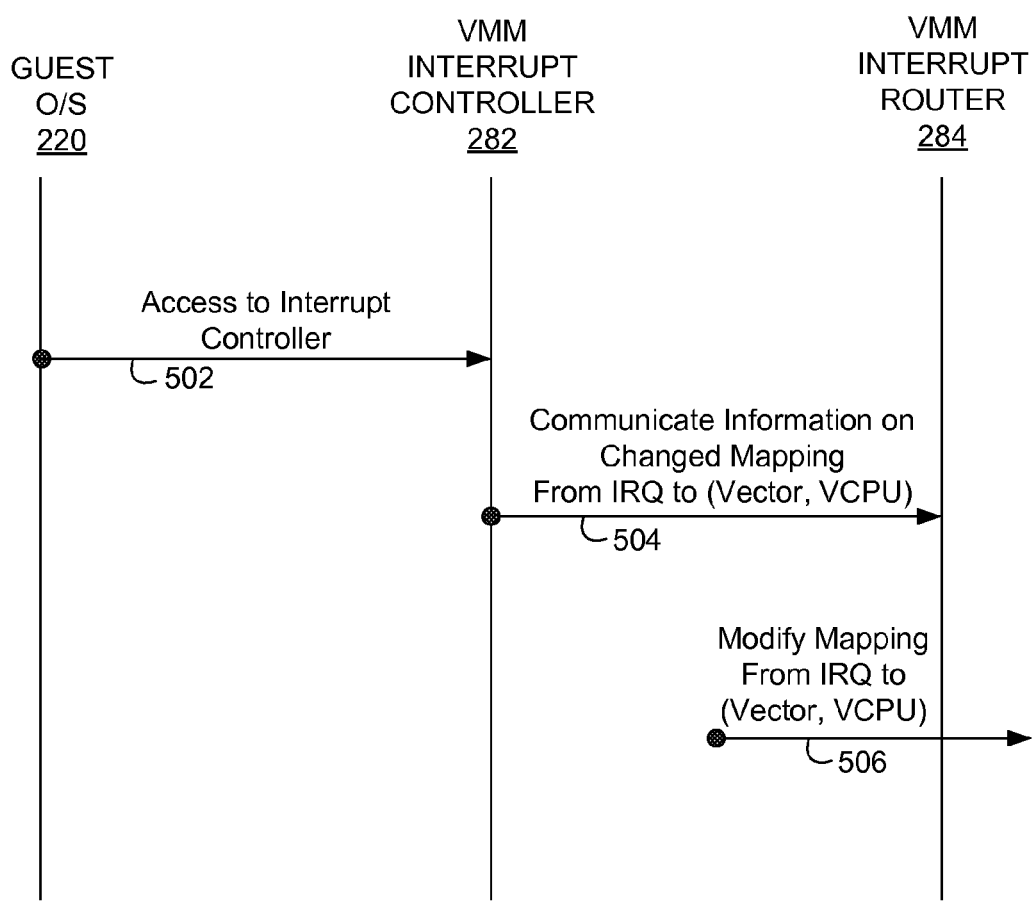
FIG. 5 is an interaction diagram illustrating how the VCPU set accessible by both the VMM and the VMkernel is established.

FIG. 5 is an interaction diagram illustrating how the VCPU set data structure 286 accessible by both the VMM 300 and the VMkernel 600 is established and maintained. The VMM 300 is responsible for keeping the VCPU set data structure 286 synchronized with the guest O/S 220 actions on each VCPU. The VMM 300 (specifically, the VMM interrupt controller 282) of each VCPU 210 intercepts all guest instructions that change virtual interrupt system routing (e.g., guest OS access 502 to the interrupt controller or device registers). Intercepting such guest instructions can be done via well known techniques such as traces for CPUs without hardware virtualization support or by enabling EXITs for processors with hardware virtualization support (VT, SVM). VT and SVM refer to technology implementing virtualization features directly in the processor by Intel Corporation and Advanced Micro Devices, Inc., respectively, and EXIT is the main operation in hardware virtualization systems based upon VT and SVM that allows the hypervisor to intercept attempts by the guest OS to change the state of the interrupt controller registers. The virtual interrupt routing information is derived by intercepting guest OS instructions that modify certain states in the interrupt controller that deal with interrupt states. Below are examples of how the virtual interrupt routing information is intercepted and derived for different types of guest interrupt systems.

8259 PIC (Programmable Interrupt Controller)

The master PIC INTR line (output) is wired into the IOAPIC line 0 and into LINT0 input line of each Local APIC. By programming IOAPIC redirection register 0 as well as APIC LVT0 register of each VCPU, the guest OS can cause the 8259 PIC to assert interrupts on an arbitrary set of VCPUs. PIC internal registers capture IRQ to interrupt vector mapping and the mask state of IRQ lines, which can be used to update the VCPU set data structure 286.

IO APIC (Input/Output Advanced Programmable Interrupt Controller)

IO APIC is used throughout the buses, and the routing information is encoded by a Redirection Table that is used to route the interrupts it receives from peripheral buses to one or more Local APICs. The Redirection Table, combined with information in the Local APICs of individual VCPUs, determines interrupt routing for each incoming interrupt line. The target VCPU information on each IO APIC Redirection Table register change is derived. The new entry value is parsed to determine the target VCPU(s) for the affected interrupt vector (also contained in the redirection register), which can be used to update the VCPU set data structure 286. This is influenced by the following fields in each redirection register: (i) Destination Field: APIC ID Physical or bitmask for Logical, (ii) Interrupt Mask, (iii) Destination Mode: Physical or Logical, (iv) Delivery Mode: Fixed, Lowest Priority, SMI, NMI, INIT, ExtINT, and (v) Interrupt Vector. In Logical Mode, Destination Field potentially defines a VCPU set. The Lowest Priority Mode is used by several Guest OS families including Microsoft Windows. This delivery mode enables additional optimizations. When APIC priorities of all VCPUs are the same, a virtual chipset is free to choose any VCPU to be a virtual interrupt target. This is often the case for many common workloads. In such a state, the VMkernel 600 can elect to follow one of the following potentially workload specific policies to select the target: (i) select a currently scheduled VCPU to minimize rescheduling; (ii) select a VCPU currently running on the physical CPU of the previous target for the same vector to exploit a previously established cache footprint of the guest interrupt handle; and (iii) dispatch an interrupt to the VCPU to be scheduled next on the current physical CPU to avoid IPIs to remote physical CPUs.

Local APIC (Local Advanced Programmable Interrupt Controller)

Local APICs manage external interrupts for the processor that it is part of. Several APIC registers influence interrupt routing for both local and external interrupts: (i) Local APIC ID, (ii) Local Vector Table (LVT) registers, (iii) Task Priority (TPR) and Processor Priority (PPR) register, (iv) Logical Destination (LDR) and Destination Format (DFR) registers, and (v) Spurious Interrupt Vector Register (SVR), which can be used to update the VCPU set data structure 286.

MSI/MSI-X (Message Signaled Interrupt)

MSI/MSI-X is a type of interrupt controller that writes to a segment of system memory to assert an interrupt. With MSI/MSI-X guest OS programs, the interrupt routing information is derived similarly to the way it programs the IO APIC, but this information is available in the device PCI configuration space. PCI configuration space accesses are intercepted to extract the routing information and update the VCPU set data structure 286.

When there are changes to the VCPU sets designated by the guest OS 220, the VMM interrupt controller 282 communicates 504 the information on the changed mappings from the IRQs to the pairs of (vector, VCPU). The VMM interrupt router 284 modifies and updates 506 the mappings from the IRQs to the pairs of (vector, VCPU) in the VCPU set data structure 286.

Note that the VMkernel 600 may run concurrently with updates to the VCPU set data structure 286. In one embodiment, mutexes can be used to serialize accesses to the VCPU set data structure 286 by the VMkernel 600 and the VMMs 300. In another embodiment, this can be also relaxed to use reader/writer locks. In still another embodiment, because each element in the VCPU set data structure 286 is small enough to be updated atomically, the entire VCPU set data structure 286 can be maintained in a lock-free fashion.

Figure 6:
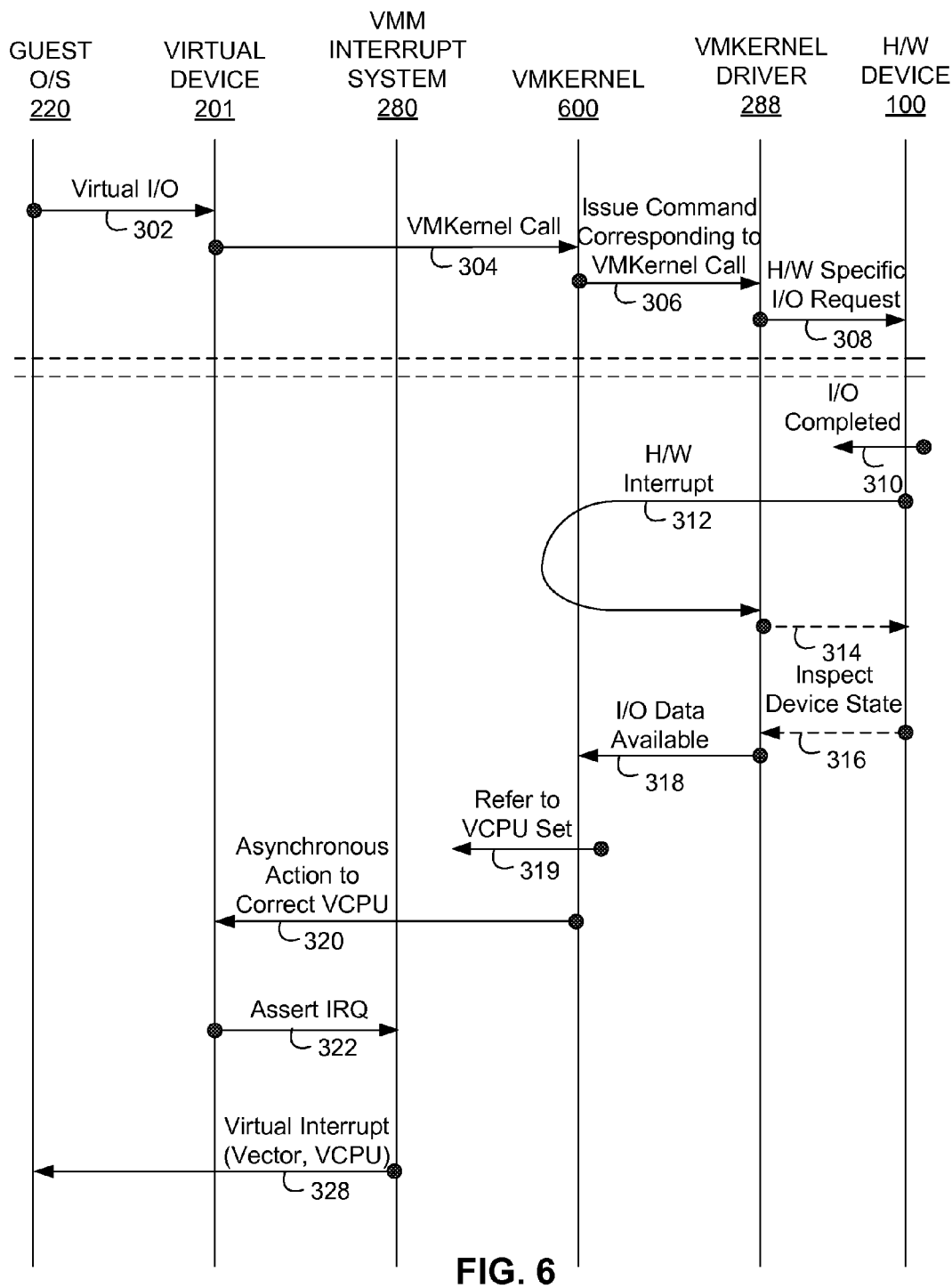
FIG. 6 is an interaction diagram illustrating how I/O is requested and completed in more detail in a virtualized computer system, according to one embodiment of the present invention.

FIG. 6 is an interaction diagram illustrating how I/O is requested and completed in a virtualized computer system in more detail, according to one embodiment of the present invention. The method described in FIG. 6 is different from the method described in FIG. 3, mostly in that the VMKernel 600 is now capable of posting correct actions to issue the virtual interrupt with the correct VCPU information, because the VMkernel 600 has access to the correct (interrupt vector, VCPU) information via the VCPU set data structure 286.

Figure 1:
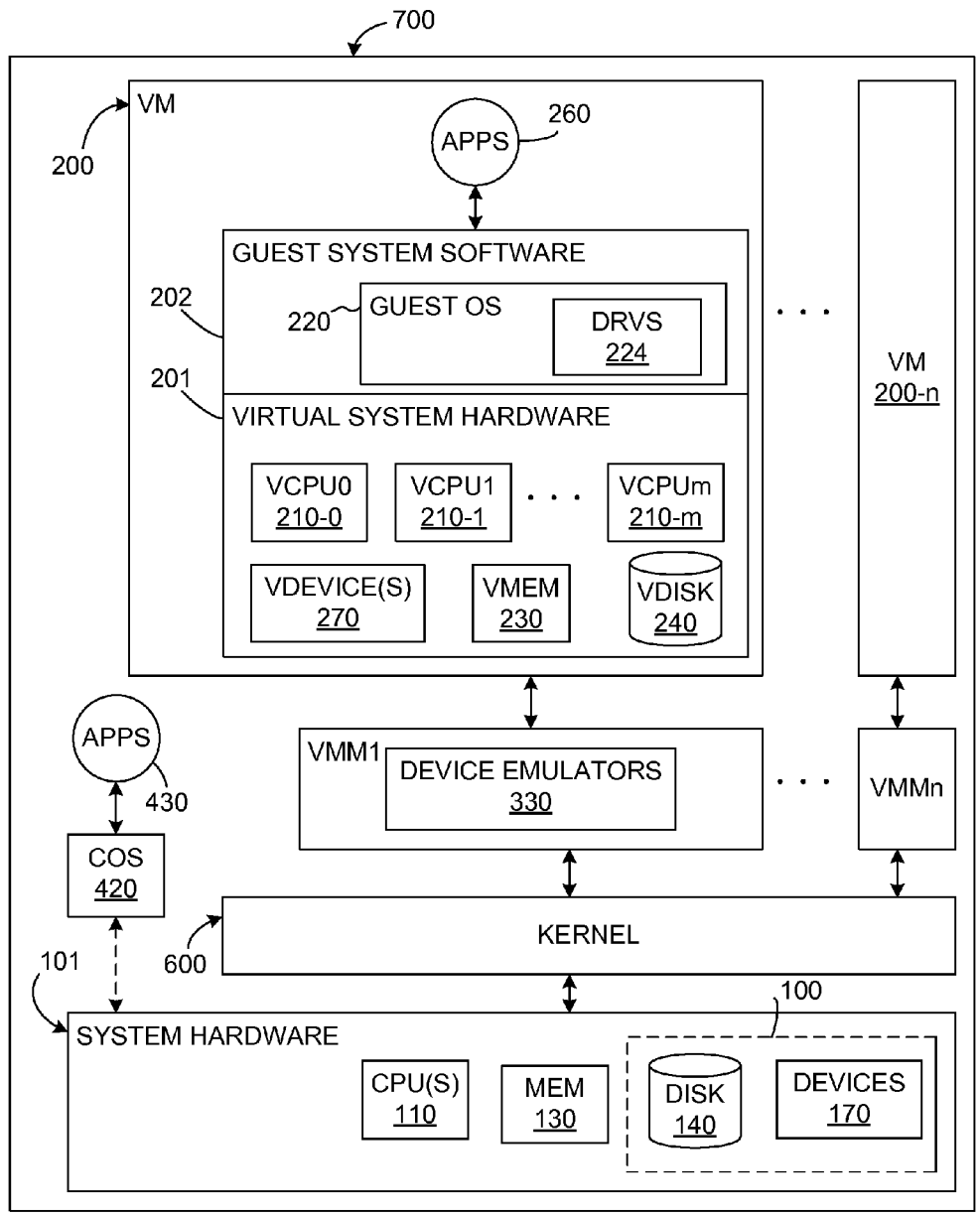
FIG. 1 illustrates a non-hosted virtualized system.
Figure 2:
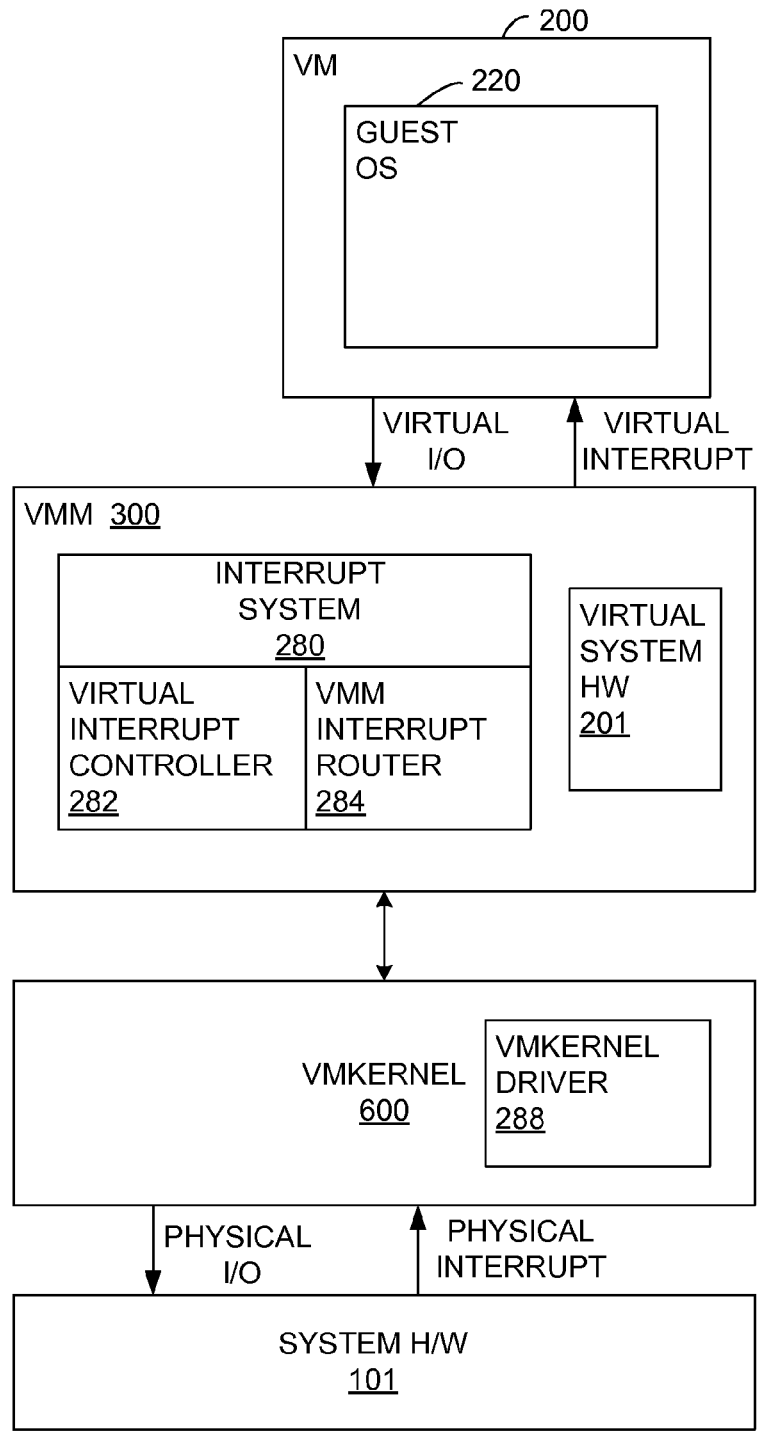
FIG. 2 illustrates how I/Os are completed in a conventional virtualized computer system.
Figure 3:
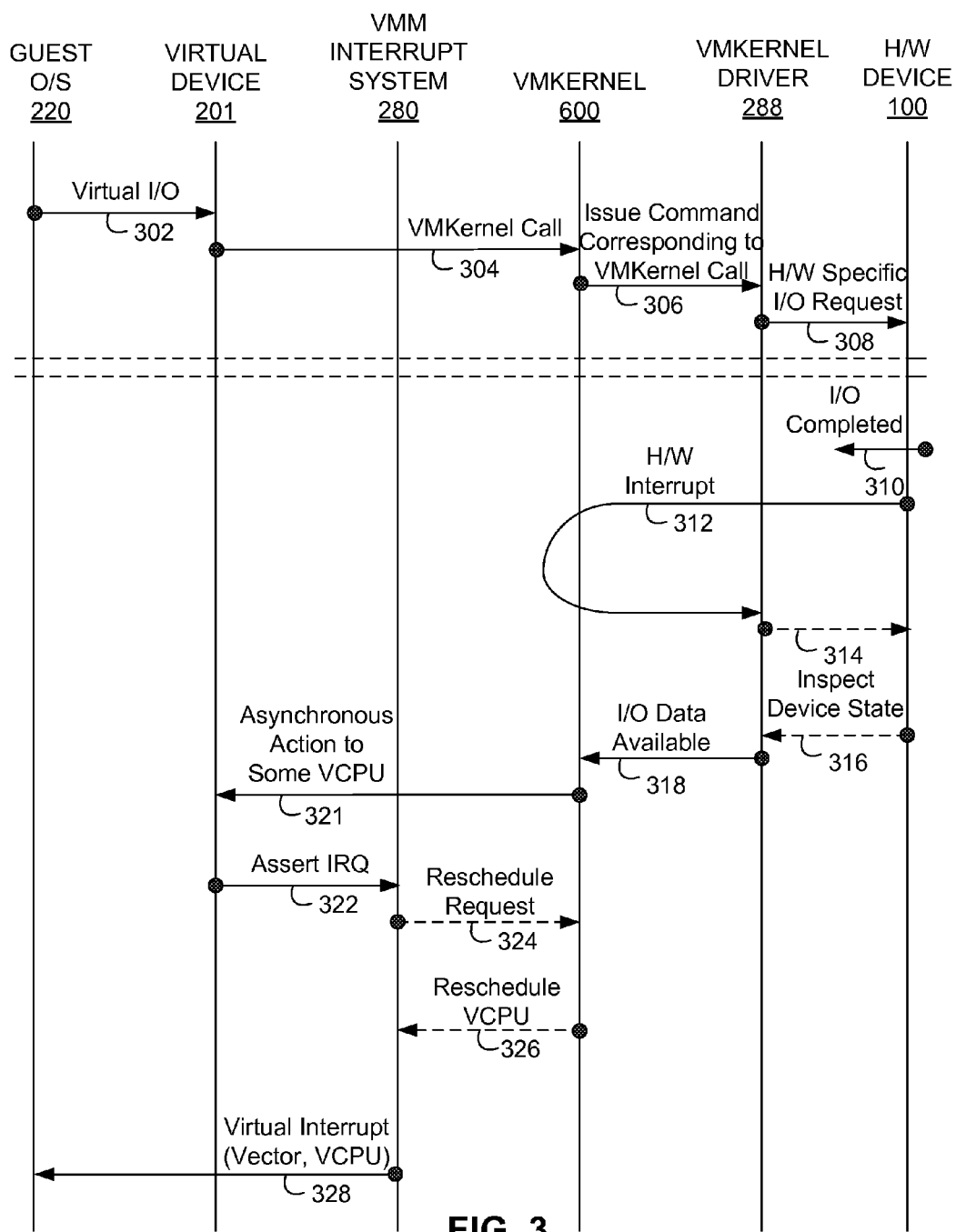
FIG. 3 is an interaction diagram illustrating how I/O is requested and completed in more detail in a conventional virtualized computer system.

Referring to FIG. 6 together with FIG. 3, the guest O/S 220 issues a virtual I/O request 302 to a virtual device 201. The virtual device 201 makes a VMKernel call 304 to the VMkernel 600, and the VMkernel 600 issues a command 306 corresponding to the VMKernel call 304 to the VMkernel driver 288. Based on the command 306 corresponding to the VMKernel call 304, the VMkernel driver 288 makes a hardware specific I/O request 308 that is specific to the hardware device 100 to which the I/O request is destined.

Thereafter, typically some time will pass (as indicated by the double dotted lines), until the I/O is actually completed 310 by the hardware device 100. The hardware device 100 makes a hardware interrupt 312 to the VMkernel driver 288 and to the VMkernel 600 to notify the VMkernel 600 that the hardware I/O is complete 310. The VMkernel driver 288 inspects (314, 316) the hardware device 100 to determine what kind of I/O occurred in the hardware device 100. The VMkernel driver 288 makes the I/O data available 318 to the VMkernel 600. In response, the VMkernel 600 refers to the VCPU set data structure 286 to determine to which VCPU a virtual interrupt should be sent to inform the completion of the I/O. The VMkernel 600 posts an asynchronous action 320 to the correct VCPU 210 (virtual system hardware 201). In this regard, the VMkernel 600 knows which VCPU 210 is responsible for the I/O and for receiving the virtual interrupt at this time, and because it referred to such information available in the VCPU set data structure 286. In response, the virtual device 201 asserts an IRQ (Interrupt Request Line) 322 to obtain the (interrupt vector, VCPU) pair for the virtual interrupt to notify the guest O/S 220 of the completion of the I/O. The guest designated target VCPU is same as the original VCPU target selected by the VMkernel 600 in step 320, because the VMkernel 600 referred to the current VCPU responsible for the I/O action in the VCPU set data structure 286. The VMM 300 dispatches a virtual interrupt 328 to the final target VCPU set with a pair of the (virtual interrupt vector, VPCU).

Upon reading this disclosure, those of skill in the art will appreciate still additional alternative structural and functional designs for reducing the delivery of reducing the latency of virtual interrupt delivery in virtual machines through the disclosed principles of the present invention. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A computer-implemented method that processes a virtual I/O request, carried out in a virtualized computer system running one or more virtual machines on virtualization software and in which a guest operating system (guest OS) running on a guest-OS-supporting virtual machine of the one of the virtual machines issues the virtual input/output (I/O) request to a virtual device, the method comprising:
    receiving the virtual I/O request;
    responsive to completing a physical I/O operation corresponding to the virtual I/O request, the virtualization software referring to a VCPU (Virtual Central Processing Unit) set data structure including information identifying a destination VCPU designated by the guest OS to handle a virtual interrupt corresponding to the virtual I/O request, the destination VCPU being one of a plurality of VCPUs provided to the guest-OS-supporting virtual machine by the virtualized computer system; and
    generating the virtual interrupt to the destination VCPU.

2. The method of claim 1, further comprising:
    updating the VCPU set data structure, responsive to determining a change in the destination VCPU.

3. The method of claim 2, wherein the determining of the change in the destination VCPU comprises:
    intercepting a guest OS instruction that modifies a state in an interrupt controller relating to an interrupt state.

4. The method of claim 1, wherein the VCPU set data structure is accessible by both a virtual machine monitor and a kernel of the virtualized computer system.

5. The method of claim 1, wherein the VCPU set data structure includes an array of VCPU sets indexed by an interrupt vector number to designate a current destination VCPU set for each interrupt vector.

6. The method of claim 1, further comprising:
    posting an asynchronous action to generate the virtual interrupt to the destination VCPU identified by the VCPU set data structure.

7. The method of claim 6, wherein the destination VCPU is the VCPU designated by the guest OS to handle the virtual interrupt and the asynchronous action need not be rescheduled to post the asynchronous action for a different VCPU.

8. A computer program product, stored on a computer readable storage medium not including a signal or carrier wave, that includes computer instructions which, when executed by one or more processors, implement a method that processes a virtual input/output (I/O) request in a virtualized computer system running one or more virtual machines on virtualization software and in which a guest OS running on a guest-OS-supporting virtual machine of the one or more virtual machines issues the virtual I/O request to a virtual device, the method implemented by the computer instructions comprising:
    receiving the virtual I/O request;
    responsive to completing a physical I/O operation corresponding to the virtual I/O request, the virtualization software referring to a VCPU (Virtual Central Processing Unit) set data structure including information identifying a destination VCPU designated by the guest OS to handle a virtual interrupt corresponding to the virtual I/O request, the destination VCPU being one of a plurality of VCPUs provided to the guest-OS-supporting virtual machine by the virtualized computer system; and
    generating the virtual interrupt corresponding to the virtual I/O request to the destination VCPU.

9. The computer program product of claim 8, wherein the method further comprises:
    updating the VCPU set data structure, responsive in response to determining a change in the destination VCPU.

10. The computer program product of claim 9, wherein the determining of the change in the destination VCPU comprises:
    intercepting a guest OS instruction that modifies a state in an interrupt controller relating to an interrupt state.

11. The computer program product of claim 8, wherein the VCPU set data structure is accessible by both a virtual machine monitor and a kernel of the virtualized computer system.

12. The computer program product of claim 8, wherein the VCPU set data structure includes an array of VCPU sets indexed by an interrupt vector number to designate a current destination VCPU set for each interrupt vector.

13. The computer program product of claim 8, wherein the method further comprises:
    posting an asynchronous action to generate the virtual interrupt to the destination VCPU identified by the VCPU set data structure.

14. The computer program product of claim 13, wherein the destination VCPU is the VCPU designated by the guest OS to handle the virtual interrupt and the asynchronous action need not be rescheduled to post the asynchronous action for a different VCPU.

15. A virtualized computer system running one or more virtual machines on virtualization software and in which a guest operating system (guest OS) running on a guest-OS-supporting virtual machine of the one or more virtual machines issues a virtual input/output (I/O) request to a virtual device, the virtualized computer system comprising:
    a storage device storing computer instructions configured to perform a computer-implemented method of processing the virtual I/O request; and
    one or more processors for executing the computer instructions, the computer instructions being configured to:
        receive the virtual I/O request;
        responsive to completing a physical I/O operation corresponding to the virtual I/O request, the virtualization software referring to a VCPU (Virtual Central Processing Unit) set data structure including information identifying a destination VCPU designated by the guest OS to handle a virtual interrupt corresponding to the virtual I/O request, the destination VCPU being one of a plurality of VCPUs provided to the guest-OS-supporting virtual machine by the virtualized computer system; and
        generate the virtual interrupt corresponding to the virtual I/O request to the destination VCPU.

16. The virtualized computer system of claim 15, wherein the computer instructions are further configured to update the VCPU set data structure, responsive to determining a change in the destination VCPU.

17. The virtualized computer system of claim 16, wherein determining the change in the destination VCPU comprises:
    intercepting a guest OS instruction that modifies a state in an interrupt controller relating to an interrupt state.

18. The virtualized computer system of claim 15, wherein the VCPU set data structure is accessible by both a virtual machine monitor and a kernel of the virtualized computer system.

19. The virtualized computer system of claim 15, wherein the VCPU set data structure includes an array of VCPU sets indexed by an interrupt vector number to designate a current destination VCPU set for each interrupt vector.

20. The virtualized computer system of claim 15, wherein the computer instructions are further configured to post an asynchronous action to generate the virtual interrupt to the destination VCPU identified by the VCPU set data structure.

\* \* \* \* \*